United States Patent
Heinz et al.

[11] Patent Number: 6,106,004
[45] Date of Patent: Aug. 22, 2000

[54] SIDE IMPACT PROTECTION DEVICE FOR AN OCCUPANT OF A VEHICLE

[75] Inventors: Martin Heinz, Stuttgart; Fred Trick, Rutesheim, both of Germany

[73] Assignee: Dr. Ing. h.c.F. Porsche AG, Weissach, Germany

[21] Appl. No.: 09/079,388

[22] Filed: May 15, 1998

[30] Foreign Application Priority Data

May 16, 1997 [DE] Germany ............................ 197 20 586

[51] Int. Cl.$^7$ .................................................. B60R 21/24
[52] U.S. Cl. ........................................ 280/729; 280/730.2
[58] Field of Search ................................. 280/729, 742, 280/728.1, 743.1, 740, 730.2, 736

[56] References Cited

U.S. PATENT DOCUMENTS

| | | | |
|---|---|---|---|
| 5,062,664 | 11/1991 | Bishop et al. | 280/743 |
| 5,211,422 | 5/1993 | Frantz et al. | 280/740 |
| 5,224,732 | 7/1993 | Warner et al. | 280/730 |
| 5,240,283 | 8/1993 | Kishi et al. | 280/729 |
| 5,494,314 | 2/1996 | Kriska et al. | 280/729 |
| 5,536,041 | 7/1996 | Acker et al. | 280/740 |
| 5,692,774 | 12/1997 | Acker et al. | 280/729 |
| 5,791,685 | 8/1998 | Lachat et al. | 280/743.1 |
| 5,853,191 | 12/1998 | Lachat | 280/730.2 |

FOREIGN PATENT DOCUMENTS

| | | |
|---|---|---|
| 0 363 986 | 4/1990 | European Pat. Off. . |
| 0 523 704 | 1/1993 | European Pat. Off. . |
| 0 711 627 | 5/1996 | European Pat. Off. . |
| 44 43 027 | 6/1996 | Germany . |
| 2 293 355 | 3/1996 | United Kingdom . |

*Primary Examiner*—Kevin Hurley
*Assistant Examiner*—Kevin McKinley
*Attorney, Agent, or Firm*—Evenson, McKeown, Edwards & Lenahan, P.L.L.C.

[57] ABSTRACT

A side impact protection device for an occupant of a vehicle includes an air bag which is divided by an interior partition into two chambers situated above one another. The lower chamber interacts with a gas generator. A primary opening having a relatively large cross-section is formed at the partition. So that an optimal functioning of both chambers of the air bag is always ensured during the inflation, at least one other opening with a relatively small cross-section is provided on the partition next to the primary opening situated outside the radiation area of the gas generator. The other opening extends at a distance to the primary opening and acts as a pressure relief valve when the lower chamber of the air bag is inflated.

21 Claims, 2 Drawing Sheets

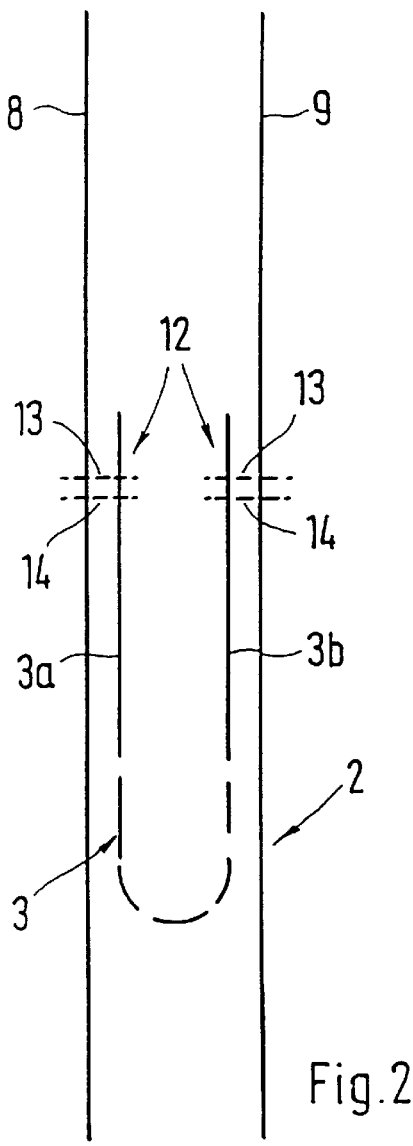
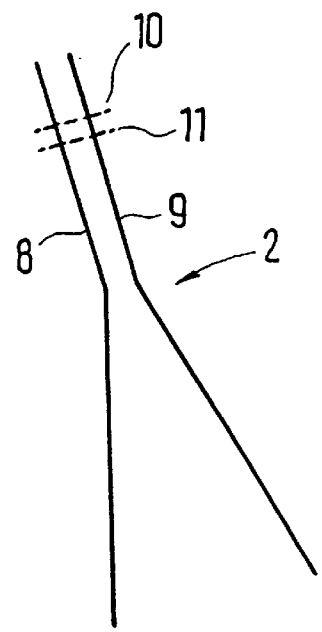
Fig. 3
Fig. 2
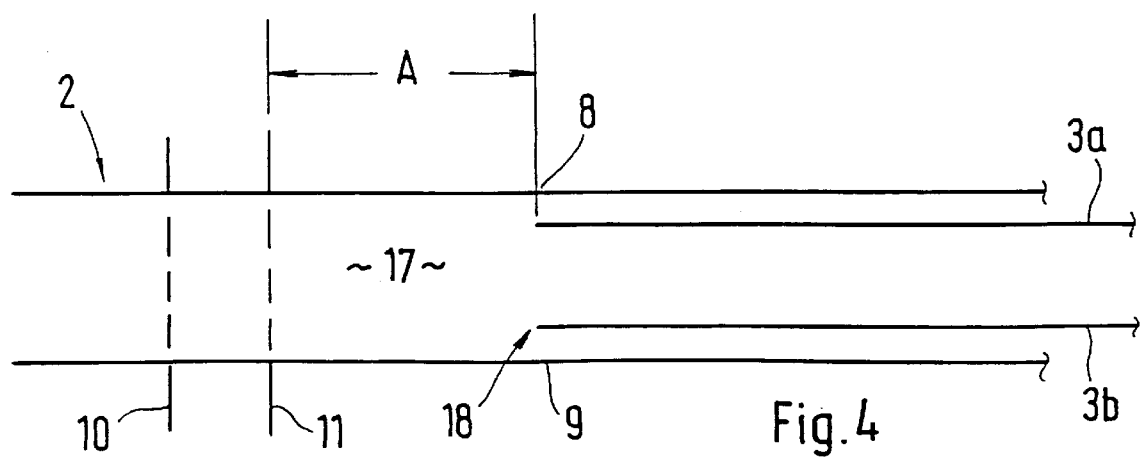
Fig. 4

SIDE IMPACT PROTECTION DEVICE FOR AN OCCUPANT OF A VEHICLE

CROSS-REFERENCE TO RELATED APPLICATIONS

This application is related to application Ser. No. 09/079,389 filed on May 15, 1998 in the name of Martin Heinz et al. for SIDE IMPACT PROTECTION DEVICE FOR AN OCCUPANT; application Ser. No. 09/080,207 filed on May 18, 1998 in the name of Martin Heinz et al. for SIDE IMPACT PROTECTION DEVICE FOR AN OCCUPANT; application Ser. No. 09/080,248 filed on May 18, 1998 in the name of Martin Heinz et al. for SIDE IMPACT PROTECTION DEVICE FOR AN OCCUPANT; the subject matter of which is incorporated herein by reference.

BACKGROUND AND SUMMARY OF THE INVENTION

This application claims the priority of German application 197 20 586.0, filed in Germany on May 16, 1997, the disclosure of which is expressly incorporated by reference herein.

The invention relates to a side impact protection device for an occupant of a vehicle, having an air bag which is divided into two chambers situated above one another by a partition, the lower chamber interacting with a gas generator, and on the partition of the air bag, which, in the inflated condition, is approximately horizontally aligned at least in sections, an oblong primary opening being formed at the end facing away from the gas generator.

German Patent Document DE 44 43 027 A1 shows an air bag for a side impact protection device, in the case of which an approximately horizontal partition arranged in the interior of the air bag divides the air bag into two chambers situated above one another. An inlet opening for the gas flow of a gas generator is provided locally on the lower chamber. On the partition, an approximately rectangular flow-through opening is provided away from the inlet opening, through which flow-through opening, after the inflation of the first chamber, the gas flow can flow into the second chamber situated above the first chamber. On the circumferential side, the horizontal partition is continuously connected with the air bag so that the gas flow can reach the second chamber only through a single flow-through opening. Under unfavorable conditions, it is possible in such an arrangement that, during the inflation of the air bag, because of the contact with the occupant, the single flow-through opening is closed at least partially or almost completely, whereby the lower chamber is then overloaded. This may result in a tearing of a seam or fabric in the lower chamber of the air bag. In contrast, the upper chamber is not filled with gas or is only partially filled with gas, which may impair the optimal functioning of the air bag, mainly if the volume of the upper chamber is approximately equally large or larger than the volume of the lower chamber.

It is an object of the invention improve a partition of an air bag consisting of two adjoining chambers such that an optimal functioning of the two chambers of the air bag is always ensured during the inflation of the air bag.

According to the invention, this and other objects have been achieved by providing an air bag which is divided into two chambers situated above one another by an interior partition, a lower of said chambers communicating with a gas generator, at least a portion of said partition being approximately horizontally aligned in an inflated condition, said partition defining a primary opening communicating said two chambers, said primary opening being situated outside of a radiation area of the gas generator, at least one of said air bag and said partition defining at least one secondary opening communicating said two chambers, said secondary opening being spaced from said primary opening, said secondary opening acting as a pressure relief valve during inflation of the lower chamber of the air bag.

According to the invention, this and other objects have been achieved by providing a method of manufacturing an air bag for a side impact protection device for an occupant of a vehicle, comprising the steps of: attaching first and second layers together at peripheral edges to define an interior space therebetween; attaching an interior partition to each of said layers to divide said interior space into an upper chamber and a lower chamber, said interior partition defining a primary opening communicating said upper and lower chambers, at least one of said air bag and said partition defining at least one secondary opening communicating said upper and lower chambers, said secondary opening being smaller than said primary opening and being spaced from said primary opening, said secondary opening acting as a pressure relief valve during inflation of the lower chamber of the air bag.

The principal advantages achieved by the invention are that as the result of the arrangement of at least one additional opening with a relatively small cross-section on the partition, a pressure relief valve is created when the first chamber is overloaded, which relieves the circumferential seams of the air bag as well as the connecting seams of the partition and the air bag as well as the fabric of the air bag.

According to certain preferred embodiments, the additional opening acting as the pressure relief valve is provided approximately above the gas generator on the lower edge of the folded partition. Furthermore, the end of the partition facing away from the large-surface primary opening ends just before the circumferential seam of the air bag so that an additional opening is formed here between the two superimposed chambers which also operates as a pressure relief valve. Because of the rounded construction of the forward and rearward end of the large-surface primary opening, during the inflation of the air bag, the fabric of the partition and the connecting seam of the two fabric layers of the air bag is protected and no tears will occur in this area.

The end of the partition which extends adjacent to the primary opening is pulled downward in a curved manner, whereby the direction of the gas flow flowing into the second chamber is influenced during the inflation such that the air bag also moves upwards toward the rear in an improved manner.

Other objects, advantages and novel features of the present invention will become apparent from the following detailed description of the invention when considered in conjunction with the accompanying drawings.

BRIEF DESCRIPTION OF THE DRAWINGS

FIG. 2 is an enlarged sectional view according to Line II—II of FIG. 1;

FIG. 3 is an enlarged sectional view according to Line III—III of FIG. 1; and FIG. 4 is an enlarged sectional view according to Line IV—IV of FIG. 1.

DETAILED DESCRIPTION OF THE DRAWINGS

Figure 1:
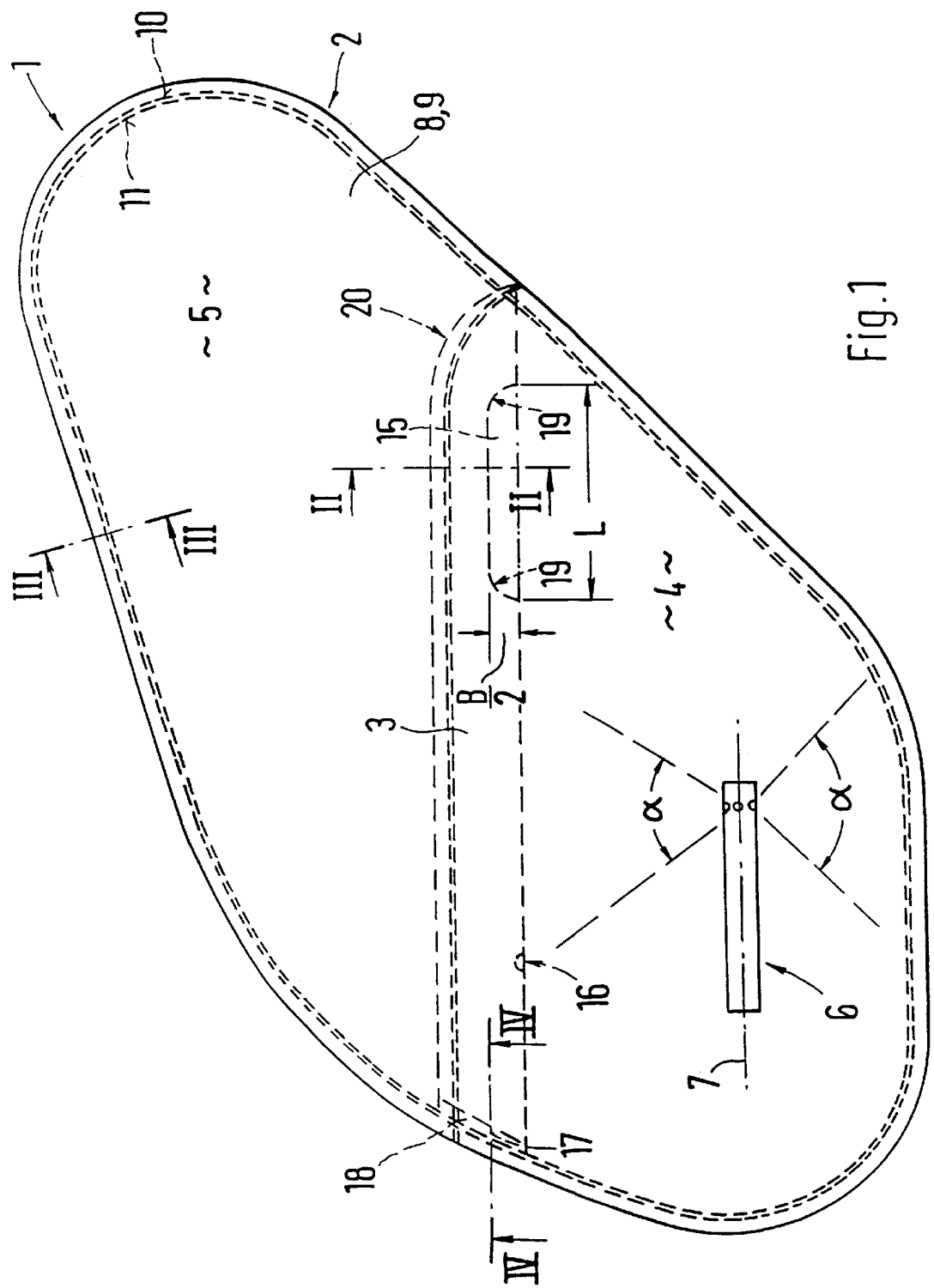
FIG. 1 is a lateral view of an air bag of a side impact protection device according to a preferred embodiment of the present invention which is divided by means of an interior partition into two chambers which are situated above one another.

A side impact protection device 1 for an occupant of a vehicle comprises an air bag 2 which is divided by means of an interior partition 3 into two chambers 4, 5 situated above one another. The lower chamber 4, which faces the occupant's chest/pelvis region, interacts with a gas generator 6 which, in the illustrated embodiment, is arranged inside the lower chamber 4 and is formed by an elongated tube generator. In FIG. 1, the approximately horizontal center axis of the tube generator has the reference number 7. The air bag 2 is formed by two approximately equally large fabric layers 8, 9 which are situated above one another and which are connected with one another on the edge side by two circumferential seams 10, 11 arranged at a narrow distance from one another. According to FIG. 2, the partition 3 is folded together approximately in halves, in which case the upper ends 12 of the two partition halves 3a, 3b are fixedly connected with the respectively assigned fabric layer 8, 9 of the air bag 2 by way of connecting seam 13, 14.

According to the invention, at least one additional secondary opening 16, 17 with a relatively small cross-section is provided on the partition 3 next to the primary opening 15 situated outside the conical radiation area α of the gas generator and having a relatively larger cross-section. This secondary opening 16, 17 extends at a distance from the primary opening 15 and acts as a pressure relief valve during the inflation of the first chamber 4 of the air bag 2. The secondary opening 16 is formed above the gas generator 6 at the lower edge of the folded-together partition halves 3a, 3b and, in the embodiment, has an approximately circular construction, although any shape may be used.

At the end facing away from the primary opening 15, the partition 3 ends in front of the circumferential seams 10 of the air bag 2 (measurement A) so that, between the upright lateral boundary 18 of the partition 3 and the spaced circumferential seam 11, the secondary opening 17 is formed which also acts as a pressure relief valve for the first chamber 4. The oblong primary opening 15 situated outside the radiation area α of the gas generator 6 has an oval cross-section with rounded end areas 19. The length L of the primary opening should preferably be relatively large and the width B should be relatively small in order to ensure a proper functioning during the inflation of the air bag 2.

According to certain preferred embodiments, the cross-sectional area of the primary opening 15 is approximately 140 mm×40 mm to approximately 160 mm×45 mm; the diameter of the secondary opening 16 is approximately 10±5 mm; and the cross-sectional area of the secondary opening 17 is approximately 70 mm×5 mm. Since air bags are made of various configurations and volumes, the relative sizes of the openings according to certain preferred embodiments may be expressed according to the following: the cross-sectional area of the primary opening 15 is about 15–25 times larger than the cross-sectional area of the secondary opening 17 (i.e., the area of the secondary opening 17 is within the range of 4%–6.67% of the area of the primary opening 15) ; and the cross-sectional area of the primary opening 15 is about 40–360 times larger than the cross-sectional area of the secondary opening 16 (i.e., the area of the secondary opening 16 is within the range of 0.28%–2.5% of the area of the primary opening 15). Clearly, the dimensions of each of the openings 15, 16 and 17 may be varied from the above-described dimensions, for example depending on the overall size and volume of the air bag 2, the relative volumes of the chambers 4 and 5, the size and location of the interior partition 3, the amount of delay desired in the inflation of chamber 5, as well as other factors which would be recognized by one skilled in the art.

The end 20 of the partition 3 extending adjacent to the primary opening 15 as well as the connecting seams 13, 14 are pulled down at the end side in a curved manner, the connecting seams 13, 14 extending beyond the circumferential seams 10, 11. By means of the curved development of the partition 3 on the rearward end 20, the gas flow is guided tangentially upwards and rearward so that the second chamber 5 is moved upwards toward the rear in an improved manner. In the inflated position of the air bag 2, the two halves 3a, 3b of the partition 3 are stretched and the partition 3 extends approximately horizontally with the exception of the rearward end 20.

According to another variant of the invention, in the event of a high load on the air bag 2, the additional opening 16 with a relatively small cross-section can expose a large opening by weakening the partition 3 (not shown in detail).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side impact protection device for an occupant of a vehicle, comprising:

an air bag which is divided into two chambers situated above one another, an interior partition by which the air bag is divided into said two chambers, a lower of said chambers communicating with a gas generator, at least a portion of said partition being approximately horizontally aligned in an inflated condition, said partition defining a primary opening communicating said two chambers, said primary opening being situated outside of a radiation area of the gas generator, at least one of said air bag and said partition defining a first secondary opening communicating said two chambers, said first secondary opening being spaced from said primary opening and acting as a pressure relief valve during inflation of the lower chamber of the air bag, said partition, at an end thereof opposite the primary opening, ending in front of a circumferential seam of the air bag to define a second secondary opening.

2. A side impact protection device according to claim 1, wherein said primary opening has a relatively large cross-section, and each of said secondary openings has a relatively small cross-section.

3. A side impact protection device according to claim 1, wherein the first secondary opening is defined at a lower edge of said partition when folded-together and above the gas generator.

4. A side impact protection device according to claim 1, wherein said end of the partition opposite the primary opening is spaced at a distance from said circumferential seam of the air bag.

5. A side impact protection device according to claim 1, wherein the primary opening is oblong and has rounded end areas.

6. A side impact protection device according to claim 1, wherein the primary opening has a relatively large length and a small width.

7. A side impact protection device according to claim 1, wherein another end of the partition adjacent the primary opening is pulled down in a curved manner.

8. A side impact protection device according to claim 1, wherein said first secondary opening, in the event of a high load on the air bag, exposes a large opening by weakening the partition.

9. A side impact protection device according to claim 1, wherein said second secondary opening has a cross-sectional area within the range of 4%–6.67% of a cross-sectional area of the primary opening, and said first secondary opening has a cross-sectional area within the range of 0.28%–2.5% of the cross-sectional area of the primary opening.

10. A side impact protection device according to claim 3, wherein said end of the partition opposite the primary opening is spaced at a distance from said circumferential seam of the air bag.

11. A side impact protection device according to claim 3, wherein said first secondary opening is approximately circular with a diameter of 10±5 mm.

12. A method of manufacturing an air bag for a side impact protection device for an occupant of a vehicle, comprising the steps of:

attaching first and second layers together at peripheral edges to define an interior space therebetween;

attaching an interior partition to each of said layers to divide said interior space into an upper chamber and a lower chamber, said interior partition defining a primary opening communicating said upper and lower chambers, at least one of said air bag and said partition defining a first secondary opening communicating said upper and lower chambers, said first secondary opening being smaller than said primary opening, being spaced from said primary opening, and acting as a pressure relief valve during inflation of the lower chamber of the air bag, said partition, at an end thereof opposite the primary opening, ending in front of a circumferential seam of the air bag to define a second secondary opening.

13. A method according to claim 12, wherein the first secondary opening is defined at a lower edge of said partition when folded-together.

14. A method according to claim 12, wherein said end of the partition opposite the primary opening is spaced at a distance from said circumferential seam of the air bag.

15. A method according to claim 12, wherein said first secondary opening is approximately circular with a diameter of 10±5 mm.

16. A method according to claim 12, wherein the primary opening is oblong and has rounded end areas.

17. A method according to claim 12, wherein the primary opening has a relatively large length and a small width.

18. A method according to claim 12, wherein an end of the partition adjacent the primary opening is pulled down in a curved manner.

19. A method according to claim 12, wherein said first secondary opening, in the event of a high load on the air bag, exposes a large opening by weakening the partition.

20. A method according to claim 12, wherein said second secondary opening has a cross-sectional area within the range of 4%–6.67% of a cross-sectional area of the primary opening, and said first secondary opening has a cross-sectional area within the range of 0.28%–2.5% of the cross-sectional area of the primary opening.

21. A method according to claim 13, wherein said end of the partition opposite the primary opening is spaced at a distance from said circumferential seam of the air bag.

* * * * *